Sept. 28, 1965 J. D. RICHARD 3,208,286
PARTICLE SIZE ANALYZER
Filed Aug. 2, 1962 2 Sheets-Sheet 1

INVENTOR
Joseph D. Richard

Sept. 28, 1965   J. D. RICHARD   3,208,286
PARTICLE SIZE ANALYZER
Filed Aug. 2, 1962   2 Sheets-Sheet 2
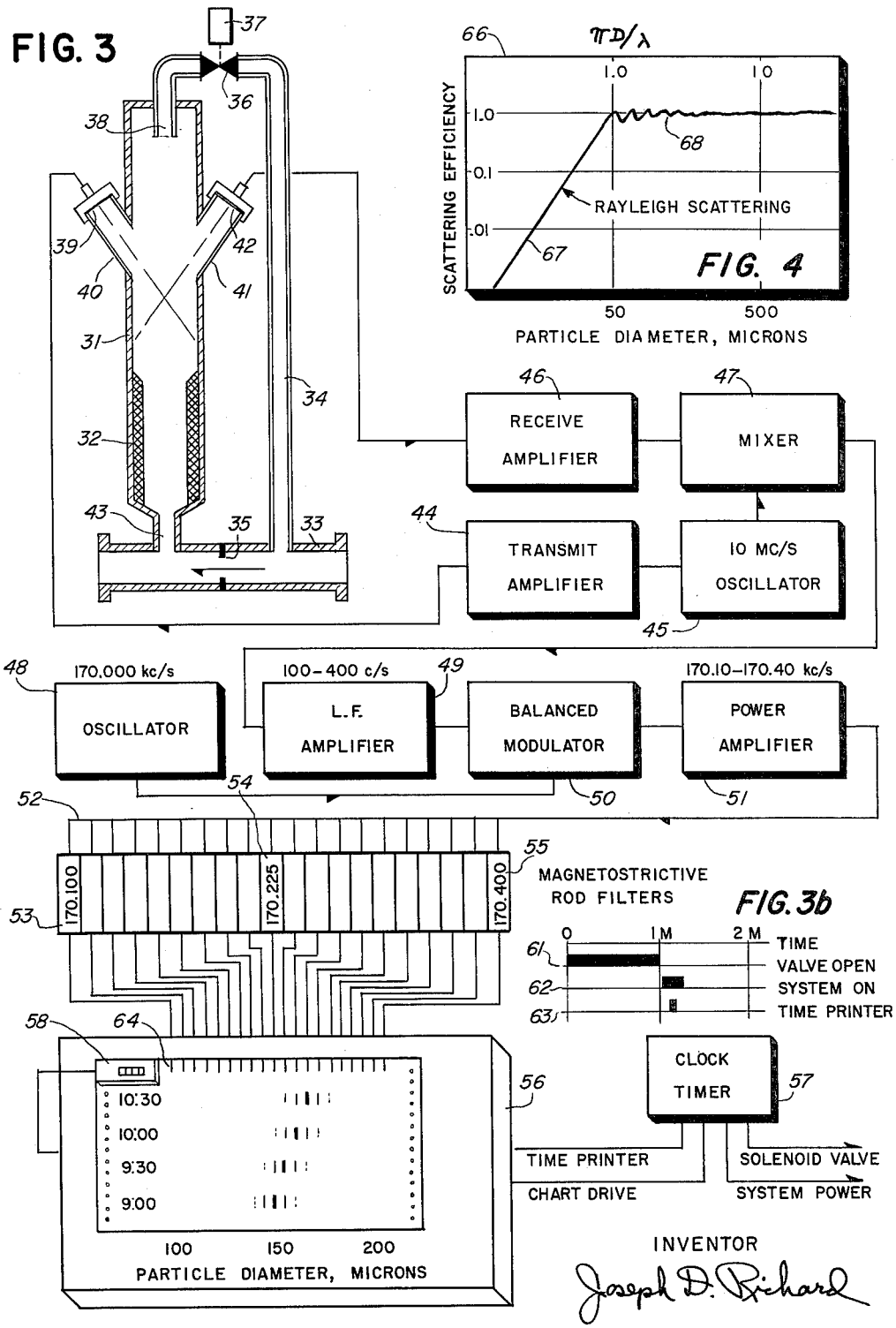

United States Patent Office 3,208,286
Patented Sept. 28, 1965

3,208,286
PARTICLE SIZE ANALYZER
Joseph D. Richard, Miami, Fla.
(531 S. Barrancas Ave., Warrington, Pensacola, Fla)
Filed Aug. 2, 1962, Ser. No. 214,285
7 Claims. (Cl. 73—432)

The present invention relates to the field of small particle measurement. More specifically it relates to a method and apparatus for the determination of the size distribution of an aggregate of particles in the sieve and sub-sieve range.

In the past a number of instruments and methods have been used for measuring the dimensions of small particles. These have included the basic techniques of microscopic count, sedimentation, permeability, photo-extinction, and adsorption. Of the above, only the first two have proven to be consistently reliable. Because the microscopic count is tedious and time consuming the sedimentation method is most often used. Sedimentation methods are based upon the well known Stokes' law which relates the terminal velocity of the suspended particle settling under the force of gravity to the density and diameter of the particle and the viscosity and density of the suspending fluid. These methods are capable of considerable accuracy even though the simplifying assumptions, such as particle sphericity and smoothness, are seldom realized in practice. Various methods have been devised for following the particle sedimentation as it progresses. Usually the decrease in concentration of particles at or above a particular level in the suspension is repeatedly measured during the sedimentation process.

The variation in particle concentration at various positions in the sedimentation column can be determined in a number of ways. The pipette, hydrometer, sediment balance, and light absorption methods have most often been used. The pipette method requires the repeated withdrawal, evaporation, and weighing of samples from the sedimentation tube. In the hydrometer method the density, and thus the concentration of the suspension at the level of the center of gravity of the displaced suspension, is determined with a hydrometer. The sediment balance method consists of weighing the particles which accumulate with time on a pan at the bottom of the settling column by means of a delicate balance fixed inside the sedimentation tube. The light absorption method is based upon the application of the Lambert-Beer law to a suspension of solid particles in a fluid medium. The shadow projected area of the particles is assumed to be proportional to the volume concentration of the particles. All of the above methods have certain disadvantages and limitations. The pipette method is accurate but extremely tedious and time consuming. The hydrometer method lacks accuracy and resolution due to the large volume of the hydrometer. The sediment balance method requires expensive and fragile apparatus. The light absorption method has certain advantages in that nothing need be inserted in the sediment tube and the measurements may be automatic and continuous. The obvious advantages of the light absorption methods are offset by the complicating factors of reflection, polarization, and scattering. The relative magnitude and interdependence of these effects vary with the wavelength of light and the relative particle size. A simple measurement of light transmitted by a sample does not uniquely define the concentration of a suspension of small particles.

Sedimentation tube sampling techniques used in the past have been fraught with various disadvantages and problems. The present invention provides a method and apparatus for determining the particle size distribution of small particles in a sedimentation column which is devoid of the above mentioned difficulties. More specifically the present invention provides a method and means for measuring directly the velocity distribution of an aggregate of particles in a sedimentation column. In this manner the size distribution may be instantly determined without the necessity of repeated samplings. The particles are allowed to fall through a beam of ultrasonic radiation. The scattered ultrasonic energy is received by a second transducer and the Doppler frequency shift measured and displayed by suitable indicating or recording apparatus. The ultrasonic wavelengths and particle sizes are confined to those relative dimensions in which the scattered energy is a direct measure of the cross sectional area of the particles involved. The relationships between particle size and terminal velocity are known from Stokes' equation. Since the terminal velocities may be continuously measured by means of the Doppler shift, the particle size distribution curve may be automatically plotted by conventional spectrum analysis techniques.

An object of my invention is to provide a method and apparatus for measuring the size distribution of small particles according to the sedimentation rate principle, in which a continuous and automatic record is made of the particle velocities by means of the Doppler shift of an ultrasonic signal which is scattered by the falling particles.

Another object of my invention is to provide a system for measuring the size distribution of particles in a sedimentation column which does not require the repeated measurement of particle concentration over a relatively long period of time.

It is a further object of the present invention to provide a measuring system for particle size distribution which requires no fragile mechanical parts such as a balance pan, or other calibrated weighing or density measuring devices.

Other objects and advantages will become more apparent from a study of the following specifications and drawings in which:

FIGURE 3 is a schematic drawing and block diagram of another form of my invention suitable for automatic operation in a process control system.

FIGURE 3B shows the time sequence of operation of the various components of the particle size monitoring system shown in FIGURE 3.

FIGURE 4 shows the scattering efficiency of various sizes of particles as related to the wavelength of the ultrasonic signal.

Figure 2:
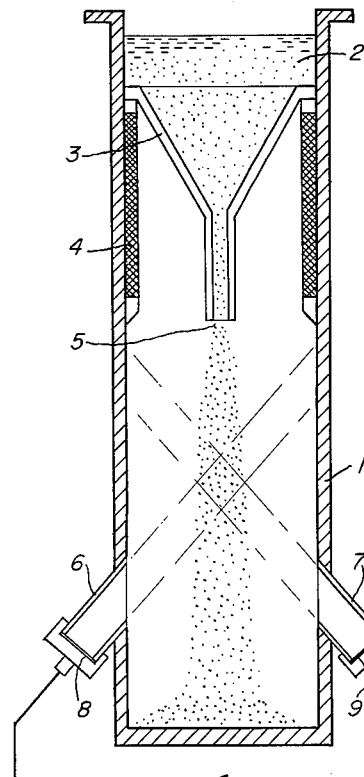
FIGURE 2 shows a typical relationship between particle diameter, particle velocity, and the corresponding Doppler frequency according to my invention.
Figure 2:
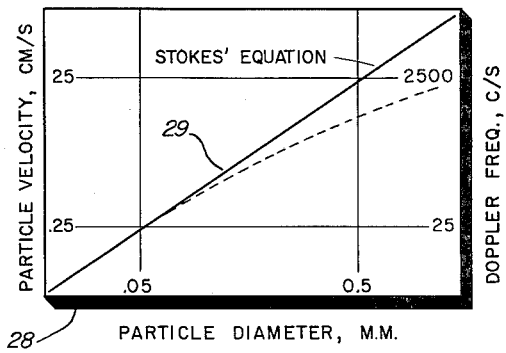

Size data of particulate materials are usually represented by a graph plotted to show the relation between frequency of occurrence and some measured dimension. When sedimentation techniques are used, the measured dimension is the Stokes' diameter of an equivalent smooth sphere of the same density and terminal velocity as the measured particle. When a spherical particle is left undisturbed in a medium in a gravitational field it will soon reach a constant velocity $$v = \frac{2(\rho - \rho_0)g}{9\eta} \cdot r^2$$

where $\rho$ is the density of the particle, $\rho_0$ the density of the medium, $g$ the acceleration due to gravity, $r$ the radius of the particle, $v$ is the velocity of the particle, and $\eta$ the viscosity of the medium. For a given suspension $$v = constant \cdot r^2$$

The radius of a particle of known density can be determined by its sedimentation velocity through a medium of known density and viscosity. The technique described herein provides a means for measuring the particle velocities directly by the frequency analysis of the Doppler shifted ultrasonic energy scattered by the falling particles.

The frequency of an ultrasonic signal which is received after reflection from a moving particle is shifted to a higher frequency when the particle is approaching the transducer and to a lower frequency when the particle is moving away from the transducer. When a signal of the original frequency is combined with the received reflected signal, a difference frequency may be derived which is shown by the familiar relationship:

$$\Delta f = f \frac{2(V_P) \cos \theta}{c}$$

where $\Delta f$ is the difference frequency, $f$ the original signal frequency, $V_p$ the velocity of the particle, $c$ the velocity of propagation of the ultrasonic signal in the suspending medium, and $\theta$ is the angle between the directional axis of the ultrasonic wave and the direction of particle motion.

Referring again to FIGURE 1, a vertically elongated sedimentation vessel 1 is shown with ultrasonic transmitting and receiving apparatus arranged for continuously measuring the scattering in a particular section of the sedimentation column through which the aggregate of particles are made to fall. A continuous signal of ten megacycles per second is generated by the oscillator 10 and amplified by the amplifier 11. The corresponding ultrasonic signal is transmitted by the piezoelectric transducer 8 so that the beam passes through the axis of the sedimentation column 1 at an angle of 41° from the vertical. A receiving transducer 9 is positioned so that its axis crosses both the axis of the transmitted beam and the axis of the sedimentation column.

Obviously the axes of the ultrasonic transducers could be positioned at other angles from the vertical. The Doppler shift would be a maximum when the transducers are positioned coaxial with the vertical axis of the sedimentation column and, of course, no shift would occur with an intercept angle of 90 degrees. The angle shown gives a convenient Doppler difference frequency range for glass spheres suspended in water at 20° C. when irradiated by a 10 mc./s. ultrasonic signal. These relationships are shown in FIGURE 2.

The sedimentation column 1 is filled with a suspending liquid 2. An aggregate of particles may be introduced into the top of the open column. The particles are concentrated into the axial portion of the sedimentation column by means of the funnel 3. The particles fall under the influence of gravity, each at a velocity determined by its diameter. When the particle aggregate falls through that portion of the column irradiated by the 10 mc./s. ultrasonic beam, the energy is scattered in all directions by the particles. A portion of the scattered energy is received by the transducer 9, amplified by the amplifier 12 and mixed with the original oscillator frequency by the mixer circuit 13. The difference frequency then becomes a measure of the velocity of the falling particles. This difference frequency is analyzed by the conventional heterodyne type analyzer shown. The difference frequency is amplified by the A.F. amplifier 14, and mixed with a sweeping oscillator frequency in the balanced modulator 15. The sum frequency alone is amplified by the I.F. amplifier 16, detected by the detector 17 and the average amplitude displayed by the vertical deflection of the X—Y recorder 19. A drive motor 22 turns the potentiometers 23 and 24. The potentiometer 23 is used to sweep the frequency of the oscillator 18. The potentiometer 24 is used to deflect the horizontal axis of the X—Y recorder 19. In this manner the horizontal axis of the X—Y recorder may be calibrated in terms of the Doppler frequency or else directly in terms of the corresponding particle sizes. The quantity of each size of particles present is then displayed by means of the relative amplitudes of the corresponding frequencies. This is possible because the technique is limited to use with particles which are relatively large in relation to the ultrasonic wavelength used. The relationships and relative scattering efficiencies are shown in FIGURE 4.

Figure 1:
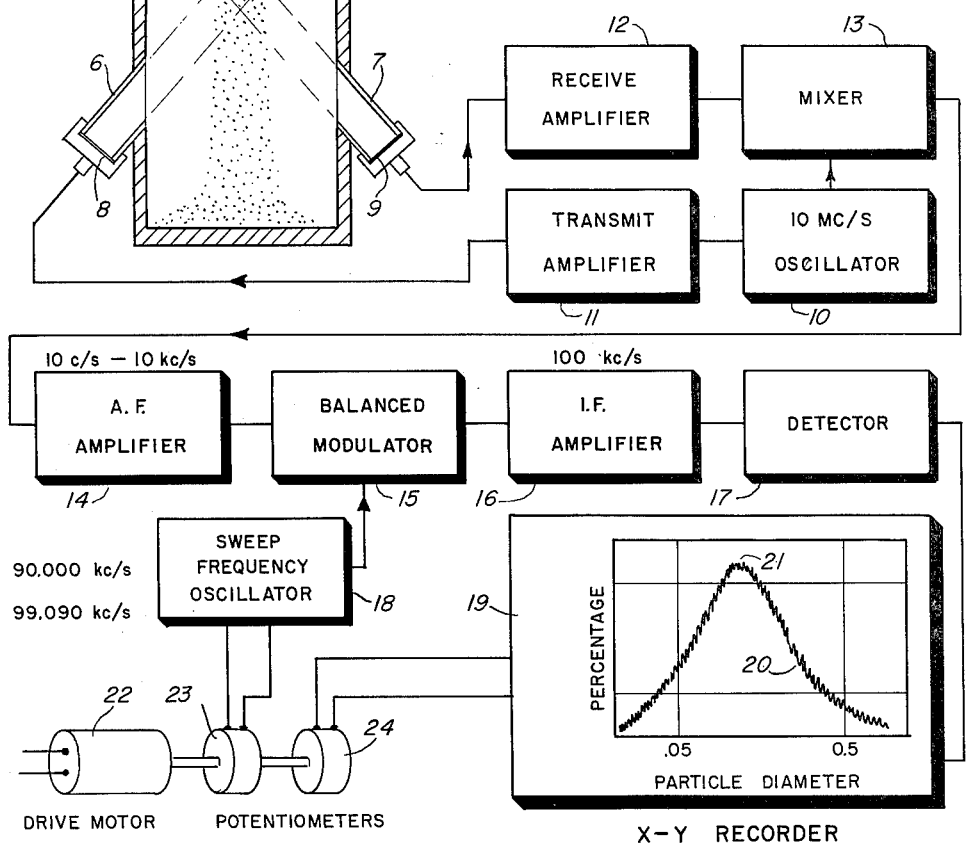
FIGURE 1 is a schematic drawing and block diagram showing the method and apparatus of my invention. The relative organization between the ultrasonic Doppler detection system, the sedimentation column, and the spectrum analyzer is shown.

FIGURE 2 shows the Doppler difference frequencies which correspond to various particle velocities when an ultrasonic signal of 10 mc./s. is used. The particle velocities refer to glass spheres of the diameters shown which are suspended in water at a temperature of 20° C. The transducers are positioned as shown in FIGURE 1 with their beam axes at an angle of 41° with the vertical.

FIGURE 3 shows an automatic system for periodically recording the size distribution of suspended particles in a continuous flow process control system. Assume that a liquid suspension of particles is flowing through the pipe 33. Assume also that it is desired to monitor, from time to time, the size distribution of the suspended particles. The measured size distribution is to be automatically recorded on a graphic recorder along with the corresponding time. The clock timer 57 controls the sequence of operations and is set to measure the particle size distribution every half hour. FIGURE 3B shows the time sequence. The solenoid valve 36 is opened and the pressure drop across the orifice 35 causes the liquid suspension to flow up the pipe 34. The sedimentation column 31 is assumed to be always full of the suspending liquid. Between cycles (when the solenoid valve 36 is closed) all of the particles settle out of the column 31 and back into the flow stream. When the solenoid valve 36 is opened, the suspension flows into the column 31 through the intake pipe 38. This flow is allowed to continue for one minute so that representative particles are flowing down through the column 31. Obviously sedimentation velocities cannot be determined at this time because the flow velocity is superimposed on the rate of fall of the particles. After one minute, the valve 36 is closed. After a delay of a few seconds to allow for turbulent motion within the column to cease, the ultrasonic Doppler system is turned on by the clock timer 57. The 10 mc./s. oscillator 45 signals are amplified 44 and transduced 39 into an ultrasonic beam through which the particles fall. In FIGURE 3 the particles fall in a direction away from the transducers. The identical difference frequencies as shown in FIGURE 2 are obtained from the output of the mixer 47 even though the scattered energy received by the transducer 42 is of a frequency lower than the original signal frequency. After a few seconds, all of the larger particles in the column 31 have fallen below the axis of the ultrasonic beam so that only a period of about five seconds is used to measure the particle velocities. The maximum sampling period should be the time it takes for the largest particles being measured to fall from the intake 38 to the point in the column where the axes of the two transducers cross. An ultrasonic absorbing material 32 is positioned within the sedimentation column 31 to minimize reverberation of the ultrasonic energy.

The Doppler difference frequencies from the mixer 47 are amplified by the amplifier 49 and combined with the high frequency signal from the oscillator 48 by the balanced modulator 50. The sum frequencies are amplified by the power amplifier 51 and are then fed into the parallel inputs of the twenty magnetostrictive rod filters. Each filter passes a different, narrow band of frequencies and the output of each filter drives one of the styli of the multi channel event recorder 56. Each stylus marks the electrosensitive chart paper with an intensity which is proportional to the output of each corresponding filter. A time printer 58 marks the paper to show the time of occurrence of each recording. The recorder is turned on briefly every half hour when the Doppler system is operating. The magnetostrictive filter frequencies and local oscillator frequency are selected to allow analysis of particle sizes between the size ranges of 100 to 200 microns. As shown in FIGURE 2, the corresponding frequencies are 100 c./s. to 400 c./s. When these frequencies are added to the oscillator 48 frequency by the balanced modulator 50 they then match the center frequencies of the filters shown. The system can accommodate other particle size ranges by simply changing the frequency of the oscillator 48. Normally the frequency of the oscillator 48 would be controlled by the same type of magnetostrictive rod filter as shown in the filter set in FIGURE 3. Temperature effects in the filter set are then compensated for by corresponding changes in the oscillator.

As shown in FIGURE 3, the particle sizes being monitored in the process control system range from 100 to 200 microns. Assume that a ball mill is grinding the particles which are being fed into the pipe 33 from which the size distribution is being monitored. Assume that the optimum particle size is 150 microns. Deviations from this optimum size may be easily observed by reference to the recorder chart in FIGURE 3. Observe how the peak of the size distribution has drifted from 150 microns at 9:00 A.M. to 160 microns at 10:30 A.M. Compensating adjustments may be made in the operation of the ball mill as soon as this drift is noticed to bring the particle sizes produced back to the desired 150 micron size. The above process could be easily done automatically so that a precisely constant range of particle sizes could be continuously produced.

The scattering of acoustic energy by a suspension of particles is much less than would be expected from their actual cross section when the individual particles have dimensions which are less than a wavelength. When the particle circumference and acoustic wavelength are equal, the effective scattering cross section equals the actual cross section. For smaller particles or longer wavelengths the scattering cross section is proportional to roughly $(\pi d/\lambda)^4$ where $d$ is the particle diameter and $\lambda$ is the acoustic wavelength.

FIGURE 4 shows the relationship between scattering efficiency and particle size for a 10 mc./s. ultrasonic signal. The portion of the curve 67 shows the Rayleigh scattering region in which there is a fourth power relationship between particle size and scattering efficiency. Obviously particles smaller than 50 microns diameter could not be analyzed with the 10 mc./s. Doppler system described. If smaller particles are to be analyzed, a higher ultrasonic frequency must be used. For example if the minimum particle size is 5 microns, then an ultrasonic frequency of 100 mc./s., or higher, must be used. Because the particle velocities vary inversely with the square of the dimensions, the velocity of the 5 micron particles would be .0025 cm./s. which would correspond to a Doppler difference frequency of only 2.5 c./s. at 100 mc./s. Higher sedimentation velocities may be achieved by suspending the particles in a liquid of very low viscosity or by the use of a centrifuge.

FIGURE 2 shows an idealized relationship between particle diameter and terminal velocity based on the assumption that the flow around the falling spheres remains streamlined even at the higher terminal velocities and that Stokes' equation would accordingly hold true. This would not be the case for the larger particles and the Stokes' relationship can only be strictly assumed for flow characteristics in which the Reynolds number is below 1. Although there is no sharp boundary between streamline and turbulent flow, when the Reynolds number exceeds 1 the turbulent flow around the surface of the particle significantly increases the coefficient of resistance so that there is obviously a limiting upper diameter to which Stokes' equation applies. This limiting diameter varies with the structural characteristics of the particles, the particle density, and the viscosity of the suspending liquid. For example if quartz particles are suspended in water, it is found that the terminal velocities are according to Stokes' equation for particles below 85 microns diameter. Between 85 microns and 2000 microns the terminal velocities vary directly as the diameter.

In the present invention, deviations from the Stokes' relationship for the larger range of particle sizes may be compensated for by suitable electronic equalization in the frequency response of the spectrum analyzer. For the 10 mc./s. Doppler system described, the particle velocity may be assumed to vary directly as the diameter over the range of 50 microns to well over 1 millimeter diameter without appreciable error in the measured size distribution. Since the 10 mc./s. system cannot be used for particles smaller than 50 microns for the reasons described earlier, a compensation circuit would not be required and the simple direct relationship between particle diameter and terminal velocity would be assumed for the entire operating range of the particle size analyzer. For example, the actual calibration curve for glass spheres suspended in water might result in a Doppler difference frequency range of 25 c./s. to 1000 c./s. for particles ranging in size from 50 microns to 1000 microns for the 10 mc./s. system. If the ultrasonic frequency were increased to 20 mc./s. the convenient relationship might be achieved where a size range of 50 microns to 1000 microns resulted in Doppler difference frequencies of 50 c./s. to 2000 c./s. As mentioned before, the particle flow characteristics cannot be considered either streamlined or turbulent so that some compromise between these two conditions must be assumed. For this reason the particle size analyzer should be calibrated carefully for the entire particle size range for which it will be used.

In the particle size analyer described herein, the particle velocity and hence the Doppler frequency shift is dependent on the viscosity of the suspending fluid. Since the viscosity varies with temperature, it would be desirable to compensate for temperature changes so that the output indicator may be scaled to read particle size directly without the need for later corrections. This may conveniently be done by a very small range frequency adjustment of the local oscillator of the spectrum analyzer. If a wide variety of particles are to be analyzed, the density difference and the viscosity (or temperature if only one liquid is to be used) may be combined into one correction which could be set on a calibrated dial which trims the frequency of the local oscillator. In the system shown in FIGURE 3, where presumably the same suspension would always be involved, only a temperature correction need be applied. As the suspension temperature increases in the pipe 33 the local oscillator 48 frequency should be decreased accordingly to compensate for the higher velocities which will result from the lowered viscosity. This can be easily done automatically by means of a suitable temperature sensitive capacitor mounted in the flow stream.

The particle size analyzer shown in FIGURE 1 may be operated using a suspending liquid of high viscosity. This would allow the particle velocities to be confined to lower values where Stokes' equation may be assumed to apply exactly. This procedure would allow a higher degree of accuracy in the determination of the particle size distribution.

It may be seen therefore that I have provided a particle size analyzer which offers numerous advantages over those instruments which have been used in the past. The principal advantage gained is the greatly reduced time required to analyze a sample of particles. The system described herein is unique in that it may be readily applied to automatic measurements in a process control system as shown in FIGURE 3.

It should be understood that the foregoing description of this invention concerns only the preferred embodiment thereof and that accordingly changes and modifications may be made therein by those skilled in the art without departing from the spirit and scope of the invention as defined in the following claims.

Having thus fully described my invention, I claim:

1. The method of measuring the average size of an aggregate of particles which comprises: introducing an aggregate of particles into a settling chamber containing a suitable liquid; allowing the particles to settle according to their respective terminal velocities; irradiating at least a portion of the said falling particles with a beam of ultrasonic energy; receiving a portion of the ultrasonic energy scattered by the said falling particles; determining the frequency difference between the said transmitted and received signals; and indicating the average size of the said particles as a function of the said difference frequency.

2. The method of measuring the size distribution of an aggregate of solid particles which comprises: introducing an aggregate of solid particles into a sedimentation chamber containing a suitable liquid; allowing the particles to settle according to their respective terminal velocities; projecting a beam of ultrasonic energy through at least a section of the said falling particles; receiving a portion of the ultrasonic energy scattered by the said falling particles; determining the spectrum of the difference frequencies between the said transmitted and received signals; and indicating the size distribution of the said particle aggregate as a function of the said frequency spectrum.

3. Apparatus for measuring the size of solid particles suspended in a liquid of known viscosity comprising: a sedimentation chamber adapted to contain a sample of solid particles suspended in a liquid; an oscillator for generating electrical signals of an ultrasonic frequency; a first transducer for transmitting ultrasonic waves into the said chamber in response to signals from the said oscillator, the said first transducer being disposed so that the axis of its ultrasonic beam pattern intercepts the vertical axis of the said chamber at an angle substantially less than normal incidence; a second transducer having an electrical output in response to received ultrasonic waves from within the said chamber, the said second transducer being disposed so that the axis of its directional response pattern passes through the point of interception of the said first transducer beam axis and the aforementioned vertical axis of the said chamber, the said second transducer being also disposed so that the axis of its directional response pattern intercepts the vertical axis of the said chamber at substantially less than normal incidence; means for introducing a suspension of solid particles into the upper portion of the said sedimentation chamber directly above the point of intersection of the ultrasonic axes of the said first and second transducers; an amplifier for amplifying electrical signals from the said second transducer; a mixer circuit for combining signals from the said oscillator with the output signals from the said amplifier, sum and difference frequency signals thereby resulting; a low pass filter for selectively passing the difference frequency signals; means for measuring the difference frequency signals; and means for indicating the size of particles falling under the force of gravity within the said sedimentation chamber as a function of the measured difference frequency.

4. Apparatus for indicating the average size of an aggregate of particles suspended in a liquid comprising: a vertically elongated sedimentation chamber adapted to contain a liquid suspension of particles; an oscillator for generating electrical signals of an ultrasonic frequency; a first transducer for transmitting an ultrasonic signal into the said sedimentation chamber in response to electrical signals from the said oscillator, the said first transducer being disposed so that the transmitting ultrasonic beam axis intercepts the vertical axis of the said sedimentation chamber at an angle substantially less than normal incidence; a second transducer having an electrical output in response to received ultrasonic signals from within the said sedimentation chamber, the said second transducer being disposed so that the receiving ultrasonic beam axis intercepts the vertical axis of the said sedimentation chamber at an angle substantially less than normal incidence and the ultrasonic axes of the said first and said second transducers both intercept the vertical axis of the said sedimentation chamber at substantially the same point; means for introducing an aggregate of particles into the said sedimentation chamber, the said particle introducing means being disposed above the point of intersection of the axes of the aforementioned ultrasonic beams; a mixer circuit for combining electrical signals from the said oscillator with the electrical output from the said second transducer, sum and difference frequencies thereby resulting; means for measuring the average difference frequency; and means for indicating the average size of particles falling under the force of gravity along the vertical axis of the said sedimentation chamber as a function of the measured average difference frequency.

5. Apparatus for measuring the sedimentation velocity of relatively dense particles suspended in a liquid comprising: a sedimentation chamber adapted to contain a liquid suspension of particles; an oscillator for generating electrical signals of an ultrasonic frequency; a first transducer for transmitting a narrow beam of ultrasonic energy into the said chamber in response to electrical signals from the said oscillator, the said first transducer being disposed so that its beam axis intercepts the vertical axis of the said chamber at an angle substantially less than normal incidence; a second transducer having an electrical output in response to the reception of ultrasonic energy from within the said chamber, the said second transducer being disposed so that the axis of its receiving response pattern intercepts the vertical axis of the said chamber at an angle substantially less than normal incidence at the same point as does the aforementioned beam axis of the said first transducer; means for introducing a liquid suspension of relatively dense particles into the said chamber; means for amplifying electrical signals from the said second transducer; a mixer circuit for combining signals from the said oscillator with signals from the said amplifying means, a difference frequency being thereby obtained when relatively dense particles fall under the force of gravity along the vertical axis of the said chamber; frequency measuring means for determining the aforementioned difference frequency; and means for indicating the sedimentation velocity of particles within the said chamber as a function of the measured difference frequency.

6. Apparatus for indicating the size distribution of an aggregate of solid particles suspended in liquid comprising: a sedimentation chamber adapted to contain an aggregate of particles in a liquid suspension; an oscillator for generating electrical signals of an ultrasonic frequency; a first transducer for transmitting a narrow beam of ultrasonic energy into the said chamber in response to electrical signals from the said oscillator, the said first transducer being disposed so that its beam axis intercepts the vertical axis of the said chamber at an angle substantially less than normal incidence; a second transducer having an electrical output in response to received ultrasonic energy from within the said chamber, the said second transducer being disposed so that the axis of its receiving response pattern intercepts the vertical axis of the said chamber at an angle substantially less than normal incidence at the same point as does the aforementioned beam axis of the said first transducer; means for introducing an aggregate of solid particles into the said sedimentation chamber, the said particle introducing means being disposed directly above the point of intersection of the ultrasonic axes of the said first and second transducers; means for amplifying electrical signals from the said second transducer; a mixer circuit for combining signals from the said oscillator with signals from the said amplifying means, a spectrum of difference frequencies being thereby obtained when various size particles move along the vertical axis of the said chamber at various velocities in response to the force of gravity; a spectrum analyzer for measuring the relative amplitude of the various frequencies of the aforementioned spectrum of difference frequencies; and means for indicating the size distribution of particles within the said chamber as a function of the output of the said spectrum analyzer.

7. Apparatus for determining the size of a solid sphere of known density comprising: a vertically elongated chamber adapted to contain a highly viscous liquid of known viscosity; an oscillator for generating electrical signals of an ultrasonic frequency; a first transducer for transmitting a narrow beam of ultrasonic energy into the said chamber in response to electrical signals from the said oscillator, the said first transducer being disposed so that its beam axis intercepts the vertical axis of the said chamber at an angle substantially less than normal incidence; a second transducer having an electrical output in response to ultrasonic signals received from within the said chamber, the said second transducer being disposed so that its ultrasonic axis intercepts the vertical axis of the said chamber at an angle substantially less than normal incidence at substantially the same point as does the aforementioned beam axis of the said first transducer; means for introducing a solid sphere into the said chamber directly above the point of intersection of the aforementioned ultrasonic axes of the said first and second transducers; means for amplifying electrical signals from the said second transducer; a mixer circuit for combining electrical signals from the said oscillator and the said amplifying means, sum and difference frequencies thereby resulting; means for measuring the difference frequency; and means for indicating the size of a solid sphere of known density falling along the axis of the said chamber as a function of the measured difference frequency.

References Cited by the Examiner
UNITED STATES PATENTS

| | | | |
|---|---|---|---|
| 2,597,899 | 5/52 | Payne | 73—432 |
| 2,908,888 | 10/59 | Kirkland | 73—194 X |

LEO SMILOW, *Primary Examiner*.

RICHARD C. QUIESSER, *Examiner*.